US009734486B2

(12) United States Patent
Blaum et al.

(10) Patent No.: US 9,734,486 B2
(45) Date of Patent: Aug. 15, 2017

(54) INTEGRATED TEMPORARY LABOR PROVISIONING AND MONITORING (71) Applicant: SAP AG, Walldorf (DE)

(72) Inventors: Carmen Blaum, Bodenheim (DE); Martina Rothley, Schwetzingen (DE)

(73) Assignee: SAP SE, Walldorf (DE)

( * ) Notice: Subject to any disclaimer, the term of this patent is extended or adjusted under 35 U.S.C. 154(b) by 784 days.

(21) Appl. No.: 13/962,337

(22) Filed: Aug. 8, 2013

(65) Prior Publication Data

US 2015/0046355 A1    Feb. 12, 2015

(51) Int. Cl.
G06Q 10/10    (2012.01)
G06F 7/00    (2006.01)

(52) U.S. Cl.
CPC .......... *G06Q 10/1053* (2013.01); *G06F 7/00* (2013.01)

(58) Field of Classification Search
None
See application file for complete search history.

(56) References Cited

U.S. PATENT DOCUMENTS

| | | | |
|---|---|---|---|
| 6,049,776 A | 4/2000 | Donnelly et al. | |
| 7,392,197 B1 | 6/2008 | Fliess et al. | |
| 7,627,508 B2 | 12/2009 | Clarke | |
| 8,051,421 B2 | 11/2011 | Wylie et al. | |
| 8,086,558 B2 | 12/2011 | Dewar | |
| 8,249,995 B2 | 8/2012 | Sheperd | |
| 8,280,822 B2 | 10/2012 | Mckeown et al. | |
| 2002/0029160 A1* | 3/2002 | Thompson | G06Q 10/063112 705/7.14 |
| 2002/0116210 A1* | 8/2002 | Medina | G06Q 10/06 705/301 |
| 2006/0085480 A1 | 4/2006 | Veronesi et al. | |
| 2007/0239513 A1 | 10/2007 | Vlanjic et al. | |
| 2009/0094239 A1 | 4/2009 | Sabol et al. | |
| 2009/0276297 A1 | 11/2009 | Ehrler et al. | |
| 2010/0030595 A1 | 2/2010 | Day | |
| 2010/0120000 A1 | 5/2010 | Bellamy et al. | |
| 2013/0097093 A1* | 4/2013 | Kolber | G06Q 10/1053 705/321 |

FOREIGN PATENT DOCUMENTS

WO    WO-2007112948 A2    10/2007
WO    WO-2013049698 A3    4/2013

* cited by examiner

Primary Examiner — Hosain Alam
Assistant Examiner — Tuan-Khanh Phan
(74) Attorney, Agent, or Firm — Schwegman Lundberg & Woessner, P.A.

(57) ABSTRACT

Various embodiments herein include temporary labor provisioning and monitoring integrated within systems and processes. Some embodiments include receiving a temporary employee hiring request including data identifying requirements for a temporary employee. The received data is then stored and an approval process is initiated. Upon receipt of approval input, candidates may then be identified within a computing system of at least one other entity based on the requirements in the stored data. A selection of an identified candidate may then be received and a purchase order for the identified candidate may be generated. Subsequently, items may be added to the stored data representative of orientation activities, equipment and supplies to be provided to the identified candidate upon start of temporary employment, and human resources activities to be performed with regard to the identified candidate following a start of temporary employment.

20 Claims, 5 Drawing Sheets

FIG. 5

INTEGRATED TEMPORARY LABOR PROVISIONING AND MONITORING

BACKGROUND INFORMATION

Temporary labor has become a critical resource for companies in times of economic risk. Temporary labor allows companies to nimbly adjust staffing to meet dynamic needs while also mitigating risks associated with hiring full time employees in changing times. However, temporary labor presents a different set of risks, which if not adequately managed, can introduce legal issues and trailing expense and exposure. Further, procuring temporary labor, ensuring legal and policy compliance, and providing, revoking, and recovering resources to and from temporary employees presents a challenging set of tasks.

DETAILED DESCRIPTION

Various embodiments illustrated and described herein provide for end-to-end, temporary labor provisioning and monitoring integrated within systems and processes. The end-to-end nature of some such embodiments begins with generating a request for a temporary employee and end with termination of the temporary employee or transition to non-temporary status. For example, some embodiments provide an interface within which a request for a temporary employee can be generated, such as providing one or more listings of skills and requirements for a temporary employee, equipment and facilities needed, training and orientation to be provided, desired start and end dates, duration of temporary employment, and the like. Items and details of each listing may be selectable and added to a shopping cart-type data structure. Once complete, a submit or other similar user interface control can be selected and a request for a temporary employee will be generated. Note as well that in some embodiments, a single request can be generated for a plurality (i.e., two or more) temporary employees through the same interface based on the same input.

When the request is created, additional details may be automatically added to the request, such as a department or other business unit from which the request is received, approvals needed based on the department or business unit, a cost accounting determined based on known or estimated costs of different elements of the request, and other data. Additional data may automatically added, but some such data may have been included in the request received via the user interface, such as the department or business unit, which may have been input by the user.

The request data structure may then be forwarded to individuals or roles from which approval is needed. For example, different management, legal, and accounting approvals may be needed. The request data structure, which in some embodiments may be the shopping cart data structure, is used to generate user interface views of the data stored therein to facilitate review and to receive approvals or denials. The data structure is then updated to reflect the approval or denial and is forwarded again as needed or returned to the original requestor when all approvals have been received or the request is denied. In some embodiments, the forwarding of the request data structure, rather than being a transmission of the actual data structure, which may be stored once in a central location such as a database, includes presenting a view of the request data structure within a user interface of another system or a system of which an integrated temporary employee provisioning and monitoring module is deployed.

When a request is denied, the requestor may be notified and the process stops. However, when approved, different activities may be added to a task list, which may be a portion of the data structure, that is to be monitored automatically, notices communicated, and some activities may be automatically performed. For example, a request for proposal may be generated and transmitted to one or more temporary employee agencies, items added to the shopping cart data structure may be automatically ordered or scheduled, workspace reserved, compliance reviews scheduled, and the like. In some such embodiments, this may include automatic order generation of needed supplies, equipment, workspace, training, and orientation and communicating automatically ordered items to other systems or a portion of a system where such things are ordered, scheduled, and processed.

Some such embodiments may include similar data processing activities, scheduling, ordering, monitoring, noticing, process triggering, and the like at different points within a term of employment of a temporary employee. Such data processing activities may be for policy and legal compliance monitoring, time entry, billing, performance review, and other purposes. The automated monitoring of activities typically will continue until the end of temporary employment, whether the temporary employment ends with termination, contract expiration, or a transition to permanent employment. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
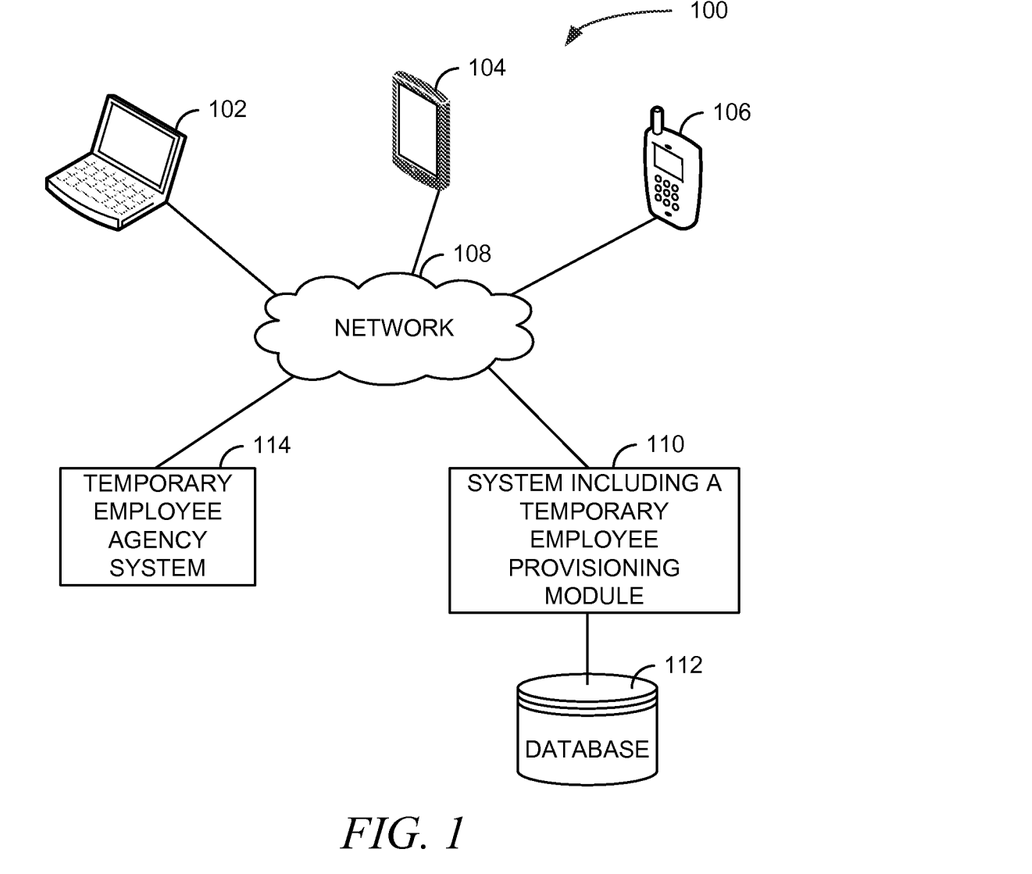
FIG. 1 is a logical block diagram of a system, according to an example embodiment.

FIG. 1 is a logical block diagram of a system 100, according to an example embodiment. The system 100 includes a software system including an integrated temporary employee provisioning module 110 (to be further referred to as module 110) that is connected to a network 108 over which client interaction occurs. In some embodiments, the module 110 further interacts with one or more temporary employee agency systems 114.

The module 110 may be a standalone software system. However, in other embodiments, the module 110 is a portion of or an add-on to one or more other software systems. Such other software systems may include one or more of an Enterprise Resource Planning (ERP) system, a Human Resources Management (HRM) system, an accounting system, Supplier Relationship Management (SRM) system, or other enterprise-class software system, such as one or more software systems available from SAP AG of Walldorf, Germany. The module 110 may include a workflow element for scheduling and monitoring activities, triggering performance of data processing activities, communicating indications of activity tasks to be performed by individuals, roles, or functions, and different actions to be taken or initiated in sequential and parallel orders. In other embodiments, the module 110 may be integrated to leverage a workflow function of one or more of the other enterprise-class software systems discussed above or a dedicated workflow system.

In some embodiments, user interaction with the module 110 occurs over the network 108 through client devices, such as personal computers 102, tablets 104, handheld and smartphone 106 devices, set top boxes, gaming devices, and other devices capable of presenting data to users, receiving input from users, and communicating data via the network 108. The client devices may interact with the module 110 via web browsers, device apps, thick-client applications installed on devices, and the like. In such embodiments, the module 110 generally is located within an application layer or a platform layer of a web and application stack of one or more systems deployed to provide the integrated temporary labor provisioning and monitoring solutions provided herein. Thus, although the module 110 is illustrated in FIG. 1 as a single block, the module 110 and associated application and platform layers may be deployed in a multi-tiered data processing environment that may include many server computers. Additionally, the module 110 and associated application and platform layers may be deployed in a distributed manner, such as in a cloud computing configuration and accessed via the Internet, which, in such embodiments, is represented by the network 108.

Figure 2:
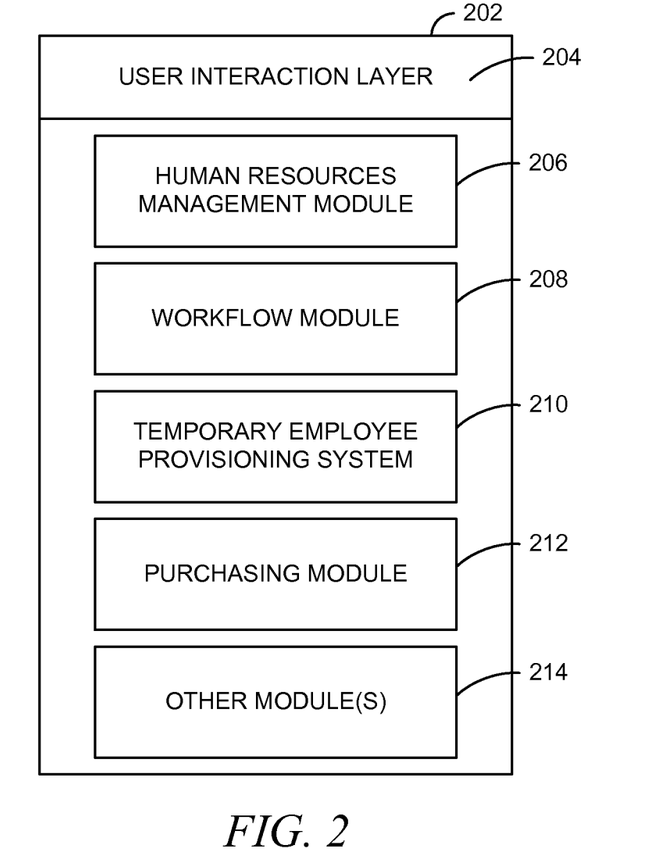
FIG. 2 is a logical block diagram of a system, according to an example embodiment.

Referring briefly to FIG. 2, FIG. 2 is a logical block diagram of a system 202, according to an example embodiment. The system 202 is a logical illustration of different software systems integrated within the system 202 landscape. The different software systems include an HRM module 206, a workflow module 208, a temporary employee provisioning system 210, which may be the same as the module 110 of FIG. 1 in some embodiments, a purchasing module 212, and one or more other modules 214. In some embodiments, users may interact directly with the different software systems and modules within the system 2022. However, in these and other embodiments, some or all users may interact with the different software systems and modules via a user interaction layer 204.

The user interaction layer 204 may include different elements in various embodiments. For example, the user interaction layer 204 may include a web server that receives user interaction requests via the Internet or other network and either routes requests or obtains and provides requested data or services. The user interaction layer may further include transformation or translation software to provide proxy services to various client types when interacting with the various different software systems and module included within the system 202. The user interaction layer may additionally, or alternatively, expose data interfaces for web browser, app, or thick-client application interaction with the various different software systems and modules included within the system 202.

The system 202 may include one or more server computers on which the various software elements of the system 202 execute. Such server computers may include one or both of physical server computing machines and virtual machines. Thus, the hardware on which the software elements of the system 202 execute may be centralized or disbursed across one or more networks.

Returning to FIG. 1, in some embodiments of the system 100, module 110 receives and stores input, retrieves and provides data, and interacts with and augments data and processes of other software systems. Data in such embodiments may be stored to and retrieved from one or more databases 112. Although the database 112 is illustrated as being directly coupled to the module 110, the database 112 may instead be accessed via the network 108 (i.e., the Internet) or another network, (i.e., a local area network, system area network, etc.). Thus, the module's 110 connection to the database 112 is illustrated in a logical sense and not necessarily a physical sense.

The database 112 may take different forms in various embodiments. For example, the database 112 may be a data storage location that stores data files utilized by the module 110 and one or more other software systems. In other embodiments, the database 112 may be a relational database management system (RDBMS). In another embodiment, the database 112 may be an in-memory database, such as HANA available from SAP AG of Walldorf, Germany.

The module 110, in some embodiments, is further capable of communicating and exchanging data with one or more external systems, such as the temporary employee agency system 114. Such communications and data exchanges may be conducted as simple messaging, such as email. However, the communications and data exchanges may be more robust and include eXtensible Markup Language (XML) encoded data exchanges, specific-format flat file data exchanges, and other data exchanges according to other defined data formats as may be communicated via known methods and protocols.

As mentioned above, users of devices interact with the module 110 via the network 108. This interaction typically begins with a user generating a request for a temporary employee position and submitting the request for approval. The request will often be generated by a manager of a business unit within which the temporary position will exist. The user accesses one or more user interfaces on their respective client device, such as personal computer 102, tablet 104, or smartphone 106, via a web browser, app, or thick-client application. Through the one or more user interfaces, the user generates the request. The user interface may include shopping cart functionality that provides mechanisms to manipulate for adding attributes of the temporary position being requested to a shopping cart. Such attributes may include data descriptive of the position, skills needed or desired, education level required or desired, hours to be worked, duration of temporary employment, an indication of whether the temporary position includes a possibility of transition to permanent employment, a business unit within which the position will exist, a location of the position, and other such information. Additional data may be added automatically. Such information may be as simple as a date and time the request is generated or more complex, such as data identifying approvals needed and to whom or what roles the request is to be routed, cost elements that are retrieved or calculated based on the received input, and other information.

In some embodiments, the user interface may present temporary position templates that can be selected and then modified. For example, the templates may include templates for positions such as administrative assistant, computer programmer, human resources generalist, and the like. Such templates generally include a set of attributes that are basic to their respective positions. Adding a template to the shopping cart causes the attributes of the respective template to the shopping cart. In some such embodiments, additional attributes may be added to the shopping and attributes of the template may be modified and removed from the shopping cart.

The request when submitted by a user and received by the module 110 will be processed to obtain approvals, as needed. However, the module 110 may perform additional processing and create additional activities on a timeline, such as within a workflow element of the module 110, a separate workflow program, or one or more workflow elements of other software systems, depending on the embodiment. The additional activities that may be created may be created in accordance with configuration settings of the module 110, the workflow program if present, or based on configurations, processes, and workflows of one or more other software systems, depending on the particular embodiment and software systems deployed. Such activities may include one or more deadlines by which approvals or denials are to be obtained, workflow activities to be monitored, actual or possible accounting expenses to be added to certain budgeting or cash flow accounts, costing activities to be performed to determine budgetary effects of adding the requested temporary position, and the like. In a typical embodiment however, approvals to be received prior to proceeding with a hiring process for a temporary employee to fill the position are determined. The needed approvals may be determined based on input received with the request, such as data included in the request identifying a person or role from which approval is needed. The needed approvals may also be automatically determined based on a business unit from which a document type or input type is received, in this case the request, in view of chain of command data or organizational chart data stored in the database 112, one or more legal and policy compliance configuration settings, and other data such as data included in the received data, specified in one or more configuration settings, and data stored in the database 112 or other data storage device or location.

In some embodiments, adding activities to a workflow or other schedule includes adding data representative of activities to a shopping cart data structure. In such embodiments, the shopping cart data structure becomes a workflow data object that is monitored and the data augmented throughout the life of the temporary employee position, from request through an end of the temporary position.

Once the activities are added to the appropriate workflow, which may include adding activities to the shopping cart data structure or to one or more workflow programs or workflow portions of other programs, the activities are monitored and are triggered, for either automated execution or messaging to individuals or other systems, to cause the activities to be performed. The activities generally include at least one human resource-type event, which may be an orientation or termination event. In some embodiments, a temporary employment lifecycle workflow is defined within a workflow system or a system including workflow functionality. A temporary employment lifecycle workflow includes specific elements to be monitored and triggered at certain points or upon certain events in during employment of each temporary employee. In such embodiments, certain activities, such as certain human resource-type activities, need not be added to the workflow as they already exist in the temporary employment lifecycle workflow. In some other embodiments, rather than adding activities to a workflow, data stored in one or more data structures storing data of temporary employees may simply be monitored in view of one or more of configuration settings, data rules, queries, and stored procedures to trigger different activities.

In various embodiments, triggers may take different forms. Triggers for activities may simply be dates, such as to trigger a messaging activity to generate and send a message to a temporary employee with a reminder to submit a record of time worked during a pay period. Other triggers may be dependent on not only a date, but also one or more data items. For example, an activity may exist to review a temporary employee three months prior to a contract end date to determine whether to terminate or transition the temporary employee to permanent employment. Such an activity may be in accordance with a legal or policy requirement that no temporary employee may remain as a temporary employee for longer than a certain period. The trigger with regard to such an activity may take into account a start date of temporary employment and a current date. The trigger may then cause the activity to be triggered which may cause certain data processing activities to occur, such as sending of a message to a business unit manager, a message to be presented in a dashboard user interface of a responsible manager of the temporary employee including a link to complete an online questionnaire about the performance of the temporary employee and information regarding a desire to retain the temporary employee as a permanent employee, and other such activities.

The activities may vary between embodiments and in particular between positions. However, activities are monitored and different data processing and noticing actions are performed in an automated manner to ensure compliance with legal and policy requirements as well as best practices and user preferences.

Figure 3:
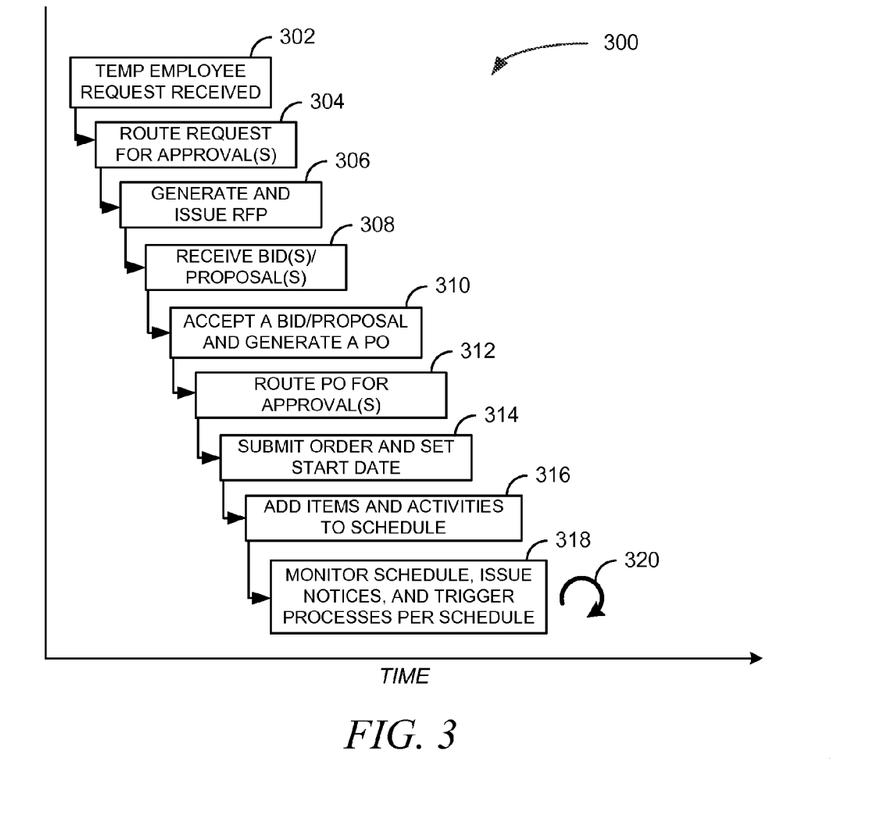
FIG. 3 is a block flow diagram of a temporary labor provisioning and monitoring processes, according to an example embodiment.

FIG. 3 is a block flow diagram of a temporary labor provisioning and monitoring processes 300, according to an example embodiment. The process 300 is an example of a process that may be performed with regard to integrated temporary labor provisioning and monitoring, such as by the module 110 of FIG. 1.

The temporary labor provisioning and monitoring processes 300 as illustrated includes several processing points. The processing at each point may occur or be triggered as a result of received input, successfully transmitted or stored output, monitoring of scheduled activities in view of a current date or passage of a period, monitoring of data, occurrence of one or more other activities, and the like. Each of the several processing points may be elements within a defined workflow of a workflow system, an enterprise-class software system as discussed above, or other system that may include workflow elements or processes which may not technically workflow processes but provide similar functionality or capabilities.

The process 300 as illustrated begins with receiving 302 a temporary employee request. The temporary employee request is typically received 302 via a network by a server-side software element that performs the process 300. The temporary employee request is received in accord with temporary employee requests as described above. While different embodiments of the process 300 may process the received 302 temporary employee request in different ways, common amongst many of such embodiments is a storing of the request and routing 304 the received 302 temporary employee request for approvals from needed parties, functions, or roles. For example, based on a business unit or manager from which the request is received 302, the routing 304 may identify one or more managers in a chain of command or organization chart represented in stored data or a configuration setting from whom approval is needed before hiring a temporary employee in accord with the request. The routing 304 may further include routing the request to one or more of legal, human resources, compliance, accounting, and other people, functions, or roles within an organization that may need to approve of the request prior to hiring a temporary employee in accord with the request.

In some embodiments, the routing 304 of the temporary employee request may include sending an email or other electronic message to the identified individuals, functions, and roles from which approval is need. The message may include a hyperlink that can be selected to open a web page that presents a view of the request and includes user interface controls to take action thereon, such as to approve, reply with questions, deny, and comment. In other embodiments, the request may be routed 304 via a workflow application or enterprise-class software system by interacting with therewith via an interface, such as an application programming interface, a web service call, storing of data in a database, or other data interchange method. The workflow application or enterprise-class computing system, in some embodiments, may then utilize its own functionality to present the request to the relevant people, receive an approval or denial and any additional comments or questions. For example, a dashboard view may present a listing of action items or received messages within which the request pending approval is included.

Next, the process 300 upon receipt of all needed approvals may generate and issue 306 a request for proposal (RFP). The RFP may be generated automatically based on data included in the received 302 temporary employee request, which may have been modified during the approval process. Automatic generation of the RFP may include generating a document according to a defined form that includes various items that describe the temporary employee position to be filled. However, in other embodiments, automatic generation of the RFP may include generating a data structure in a form that can be communicated to and processed by a software system of a temporary employee agency, an online job posting website, and the like. In some additional embodiments, the generation of the RFP may be a manual process that may or may not be facilitated by an application associated with the process 300, such as a user interface tool of an app, online application, or thick-client application. In some embodiments, the RFP may be generated in multiple forms depending on a number of entities to which the RFP is to be issued 306.

Issuance 306 of the RFP, once generated, may then be performed in any number of ways, depending on the form of the generated RFP and to the entities to which the RFP is to be issued. For example, the RFP may be communicated in an XML form as an attachment to an email, to an exposed interface of an entity such as an employment agency or job posting web site, or in another electronic format. Further, the RFP may simply be emailed as a document or printed and mailed via the postal service. Regardless of how the RFP is generated and issued 306, bids or proposals will be received 308 in response.

The bids or proposals received 308 may be in the form of resumes in electronic or paper form. However, in other embodiments, the bids or proposals received 308 may be in electronic form, such as data files, XML files, one or more emails, and the like. The received 308 bids or proposals will typically include cost information with regard to each candidate temporary employee and may include resume information. The data received 308 with regard to each candidate may include further information such as attached documents which may include a resume and references, or a hyperlink to a location from which such data can be retrieved via the Internet.

A received 308 bid or proposal will then be accepted 310 and the acceptance may be communicated to the respective entity from whom the accepted bid or proposal was received. However, the acceptance 310 may not be communicated immediately. Instead, in some embodiments, the acceptance 310 is received and a purchase order is generated. The purchase order may then be routed 312 to obtain any needed approvals, such as to one or more of the same people that approved the received 302 temporary employee request, accounting, or others based on one or more an identifier of the data or document type received, configuration settings, defined workflows, and the like. Upon receipt of the approvals of the purchase order, an order accepting the bid or proposal may be generated and submitted to the proper entity whose bid or proposal is being accepted. The order accepting the bid or proposal may be generated automatically in response to received approval input, when needed, and programmatic logic and configuration settings.

In some embodiments, upon submitting the order and setting the start date, the process 300 automatically adds 316 items and activities to a schedule. The items and activities may include supplies, equipment, training, orientation, security access credentials, and other such items and activities that were included in the received 302 temporary employee request, such as may be been added to a shopping cart by a temporary employee requestor when generating the request. Adding 316 these items and activities to the schedule may include interacting with other software systems or software systems components to order items and training to be provided to the temporary employee, such as a computer workstation, office supplies, employee handbook, orientation and training, and the like. Additional activities may also be added 316 to the schedule such as messaging activities to cause messages to be sent to the employee or supervising personal about certain critical dates, such as an approaching or actual end date of a probationary period of temporary employment, termination date of a temporary employment contract, and other such dates.

The process 300 additionally includes monitoring 318 the schedule and other data in a recursive manner (represented in FIG. 3 by the recursion symbol 320). The monitoring 318 is performed against scheduled activities and automatically issues notices and automatically triggers processes that are either scheduled or identified as needed in view of dynamically changing data, evolving policies and legal requirements, process configurations, and the like.

Figure 4:
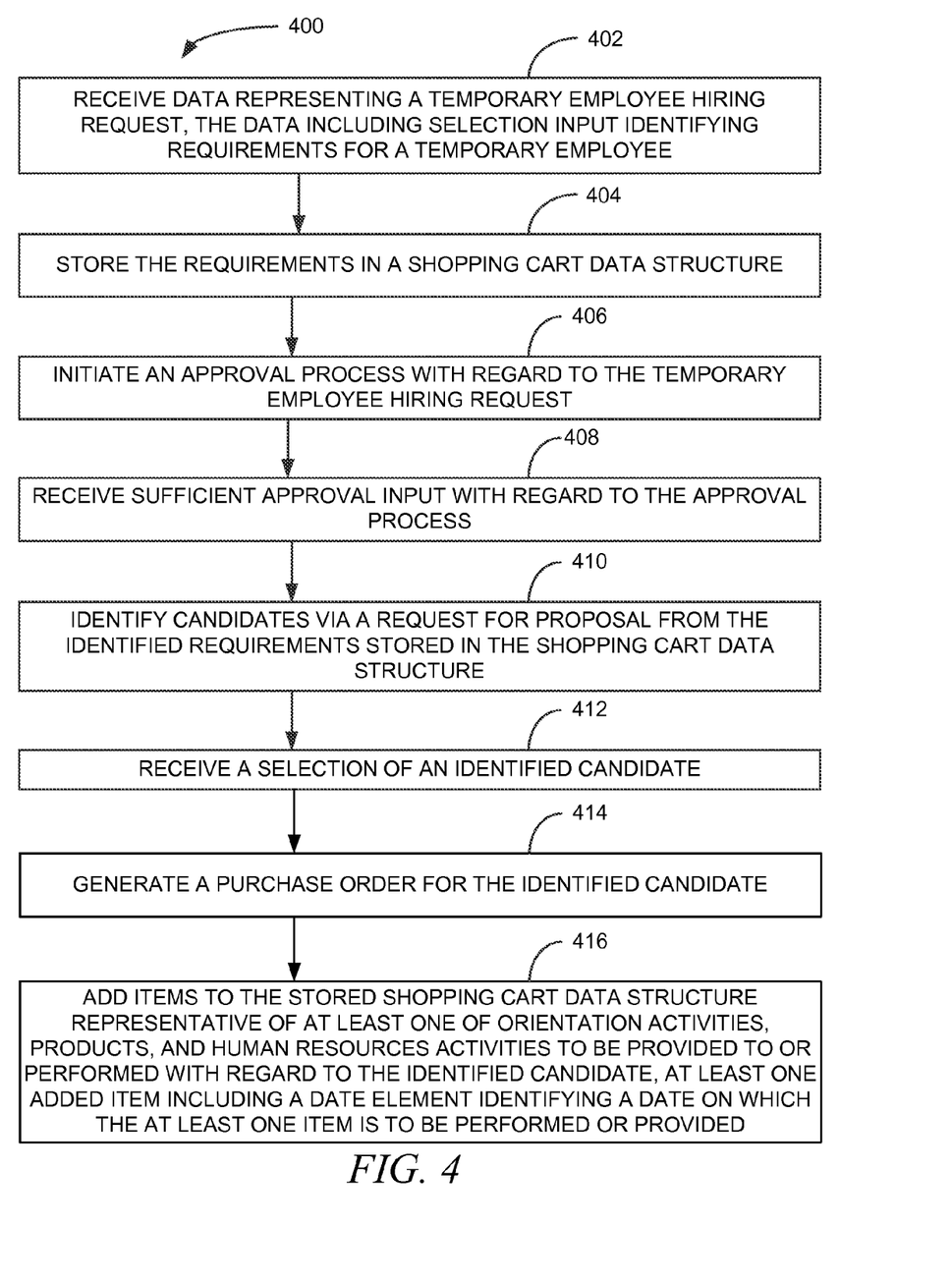
FIG. 4 is a block flow diagram of a method, according to an example embodiment.

FIG. 4 is a block flow diagram of a method 400, according to an example embodiment. The method 400 is an example of a temporary labor provisioning and monitoring method according to some embodiments. In some such embodiments, the method 400 may be performed in whole or in part by the module 110 of FIG. 1 or by the temporary employee provisioning system 210 of FIG. 2.

The method 400 includes receiving 402, via a network within a computing system, data representing a temporary employee hiring request. The received data may include selection input identifying requirements for a temporary employee, such as education level, skills, and the like. The method 400 may then store 404 the requirements in a shopping cart data structure and initiate 406 an approval process with regard to the temporary employee hiring request. The approval process may include communicating pending requests to appropriate people or functions to solicit their approval or denial.

In some embodiments, initiating 406 an approval process includes determining at least one approval to obtain within the approval process for the temporary employee hiring request to be approved. Determining the at least one approval to obtain may include applying a defined workflow to a management structure represented in stored data. The management structure in such embodiments will typically be a form of an organization chart or a chain of command. The management structure is retrieved is such embodiments based on data identifying a business unit within which a temporary employee of the temporary employee hiring request is to work or from which the request was received 402. Once the needed approvals are determined, some such embodiments then route a representation of the temporary employee hiring request to receive approval or disproval input with regard thereto. Subsequently, such embodiments include receiving and storing a representation of each received approval and disproval.

Upon receipt 408 of sufficient approval input with regard to the approval process, the method 400 includes identifying 410 candidates via a request for proposal from the identified requirements stored in the shopping cart data structure. Sufficient approval input is generally input defined with a system implementing the method 400 to be sufficient for the received 402 request to be approved. In some embodiments, sufficient input is a configuration setting that may indicate all determined approvals are needed. However, in other embodiments a threshold approval level may be defined. Additionally, approvals from certain individuals indicated either by their identity or a role or position they fill may be sufficient or be weighted more heavily. Identifying 410 candidates may include generating and transmitting an RFP to a temporary employment agency and receiving information with regard to one or more candidates in response thereto. Alternatively, identifying 410 candidates may include retrieving data of potential candidates from a job posting web site received in response to a posting listing the temporary employee opening.

The method 400 may then receive 412 a selection of an identified candidate and generates 414 a purchase order for the identified candidate. Generation 414 of the purchase order may include interaction with an accounting system to cause a budgetary item to be added to one or more accounts and cause additional data processing activities to be performed in the accounting system.

Following generation 414 of the purchase order, the method 400 includes adding 416 items to the stored shopping cart data structure representative of at least one of orientation activities, products, and human resources activities to be provided to or performed with regard to the identified candidate. Such items may be standardized for all employees, all temporary employees, or employees having certain positions, working in certain locations, or having certain terms of employment. In some such embodiments, at least one added 416 item includes a date element identifying a date on which the at least one item is to be performed or provided, such as a start date when a workspace is to be provided.

Figure 5:
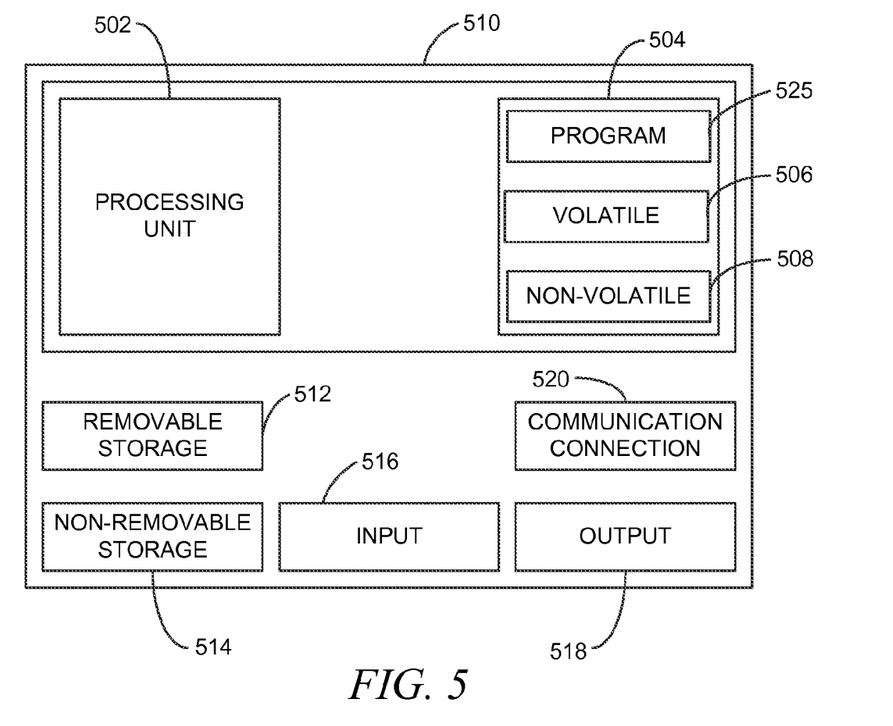
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, or other computing device including the same or similar elements as illustrated and described with regard to FIG. 5. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The input 516 may include one or more of a touchscreen, touchpad, mouse, keyboard, camera, and other input devices. The computer may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

Another embodiment is in the form of a system including at least one processor, at least one memory device, and at least one network interface device. The system of such embodiments further includes a temporary employee request module, an approval module, a temporary employee selection module, and a monitoring module. Each of these modules are stored in the at least one memory device and are executable by the at least one processor.

The temporary employee request module is executable by the at least one processor to generate a temporary employee requisition based on a received temporary employee hiring request. The request is typically received via that at least one network interface device and includes data representing temporary employee attributes selected within a rendering of renderable user interface data provided by the temporary employee request module.

The approval module is executable by the at least one processor to receive the temporary employee hiring requisition and to determine and obtain at least approval needed for the temporary employee hiring requisition to be approved.

The temporary employee selection module is executable by the at least one processor to receive data selecting a candidate temporary employee and to add data items to a stored shopping cart data structure representative of at least one of orientation activities, products, and human resources activities. The selected orientation activities, products, and human resources activities are to be provided to or performed with regard to the selected candidate temporary employee at a start of temporary employment and throughout a duration of the temporary employment. Typically, each item is added to the stored shopping cart data structure including a monitoring date for provisioning or performance of the respective item.

The monitoring module is executable by the at least one processor to monitor items in the stored shopping cart data structure for compliance of provisioning or performance of each item.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving, via a network within a computing system, data representing a temporary employee hiring request, the data including selection input identifying a first requirement for the temporary employee hiring request;
    storing the first requirement in a shopping cart data structure describing the temporary employee hiring request;
    initiating an approval process with regard to the temporary employee hiring request by routing the shopping cart data structure for a first approval to make the employee hiring request;
    receiving approval input indicating that the first approval is granted;
    upon receipt of the approval input with regard to the approval process, sending a request for proposal to a temporary employee agency system, wherein the request for proposal describes the first requirement stored in the shopping cart data structure;
    receiving a selection of an identified candidate;
    generating a purchase order for the identified candidate;
    adding to the shopping cart data structure a first item representative of an orientation activity to be performed for the identified candidate, the first item comprising a date element identifying a date on which the orientation activity is to be performed; and
    adding to the shopping cart data structure a second item representative of at least one of supplies or equipment to be provided to the identified candidate and a date when the supplies or equipment is to be provided to the identified candidate.

2. The method of claim 1, wherein initiating the approval process includes:
    determining at least one approval to obtain within the approval process for the temporary employee hiring request to be approved, the at least one approval including the first approval and a second approval;
    routing the shopping cart data structure for a second approval;
    receiving second approval input indicating that the second approval is granted; and
    storing a representation of the second approval.

3. The method of claim 2, wherein determining the at least one approval to obtain within the approval process for the temporary employee hiring request to be approved includes applying a defined workflow to a management structure represented in stored data, the management structure retrieved based on data identifying a business unit within which a temporary employee of the temporary employee hiring request is to work.

4. The method of claim 3, further comprising, before sending the request for proposal, determining that sufficient approval input has been received for the temporary employee hiring request, wherein sufficient approval input is a data element within the defined workflow that defines at least a threshold of approvals to be received for the temporary employee hiring request to be approved.

5. The method of claim 1, further comprising adding to the shopping cart data structure a first event to be monitored to a temporary employment lifecycle workflow for the identified candidate.

6. The method of claim 5, wherein the first event added to the temporary employment lifecycle workflow for the identified candidate includes a date, wherein an occurrence of the date automatically triggers a human resource management process.

7. The method of claim 6, wherein the human resource management process triggered upon occurrence of the date is a temporary employment termination process.

8. A non-transitory machine-readable storage medium, with instructions stored thereon, which when executed by at least one processor of at least one machine, cause the at least one machine to:

receive data representing a temporary employee hiring request, the data including selection input identifying a first requirement for the temporary employee hiring request;

store the first requirement in a data structure describing the temporary employee hiring request;

initiate an approval process with regard to the temporary employee hiring request by routing the data structure for a first approval to make the employee hiring request;

receiving approval input indicating that the first approval is granted;

upon receipt of the approval input with regard to the approval process, send a request for proposal to a temporary employee agency system, wherein the request for proposal describes the first requirement stored in the data structure;

receive a selection of an identified candidate;

generate a purchase order for the identified candidate;

add to the data structure a first item representative of an orientation activity to be performed for the identified candidate, the first item comprising a data element identifying a date on which the orientation activity is to be performed; and adding to the data structure a second item representative of a product activities, equipment and supplies to be provided to the identified candidate upon start of temporary employment and a date when the equipment and supplies are to be provided to the identified candidate.

9. The non-transitory machine-readable storage medium of claim 8, wherein initiating an approval process includes:

determine at least one approval to obtain within the approval process for the temporary employee hiring request to be approved, the at least one approval including the first approval and a second approval;

rout the data structure for a second approval;

receive second approval input indicating that the second approval is granted;

store a representation of the second approval each received approval and disproval; and trigger the send of the request for proposal upon receipt of the first approval and the second approval.

10. The non-transitory machine-readable storage medium of claim 8, wherein a hiring process is triggered with regard to the identified candidate by generation of the purchase order.

11. The non-transitory machine-readable storage medium of claim 8, with further instructions stored thereon, which when executed by at least one processor of at least one machine, further cause the at least one machine to:

receive time entries from the identified candidate via a mobile app interface;

store the received time entries; and process the stored time entries for payment.

12. The non-transitory machine-readable storage medium of claim 8, with further instructions stored thereon, which when executed by at least one processor of at least one machine, further cause the at least one machine to:

add to the data structure a first event to be monitored to a temporary employment lifecycle workflow for the identified candidate, the first event added at an occurrence of at least one of receipt of the approval input, selection of the identified candidate, generation of the purchase order, or a start date of employment for the identified candidate.

13. The non-transitory machine-readable storage medium of claim 12, wherein the first event added to the temporary employment lifecycle workflow for the identified candidate includes a date, wherein an occurrence of the date automatically triggers a human resource management process.

14. The non-transitory machine-readable storage medium of claim 8, wherein items within the data structure are removed from the stored data structure upon completion of respective activity' or provisioning of respective equipment and supplies to the identified candidate.

15. A system comprising:

at least one processor, at least one memory device, and at least one network interface device;

a temporary employee request module stored in the at least one memory device and executable by the at least one processor to generate a temporary employee requisition based on a temporary employee hiring request, received via that at least one network interface device, the temporary employee hiring request including data representing a first temporary employee attribute selected within a rendering of renderable user interface data provided by the temporary employee request module;

an approval module stored in the at least one memory device and executable by the at least one processor to receive the temporary employee hiring requisition, to determine and obtain a first approval to make the temporary employee hiring requisition to be approved, to route the temporary employee requisition for the first approval, and to receive approval input indicating that the first approval is granted;

a temporary employee selection module stored in the at least one memory device and executable by the at least one processor to, upon receipt of the approval input, send a request for proposal to a temporary employee agency system, wherein the request for proposal describes the first temporary employee attribute, receive data selecting a selected candidate temporary employee to add to the temporary employee requisition a first data item representative of an orientation activity to be performed for the selected candidate temporary employee, the first item comprising a date element identifying a date on which the orientation activity is to be perform and a second data item representative of at least one of supplies or equipment to be provided to the selected candidate temporary employee, the second data item comprising a second date element identifying a date on which the supplies or equipment is to be provided to the selected candidate temporary employee; and a monitoring module stored in the at least one memory device and executable by the at least one processor to monitor items in the temporary employee requisition for compliance of provisioning or performance of each item.

16. The system of claim 15, wherein the monitoring module, upon occurrence or transpiring of a monitoring date of an item in the temporary employee requisition issues an alert with regard thereto.

17. The system of claim 15, the temporary employee selection module is also to add to the temporary employee requisition a second data item representative of a human resources activity to be performed for the selected candidate, wherein the human resources is an activity to be performed with regard to a legal requirement.

18. The system of claim 17, wherein the human resources activity is a termination or permanent hire deadline, an occurrence of which indicates a date on which a temporary employee must be either terminated or transitioned to permanent employment.

19. The system of claim 15, wherein the temporary employee selection module includes a data interchange interface to receive temporary employee data with regard to available temporary employees from the temporary employee agency system, to provide renderable user interface data including received temporary employee data.

20. The system of claim 15, wherein the approval module is also to determine and obtain a second approval for the temporary employee hiring requisition to be approved, a first role from which the first approval is needed, and a second role from which the second approval is needed.

* * * * *